United States Patent

[11] 3,559,665

[72] Inventors John Christopher Hammond Davis;
  Guy Edward Davies, Taplow, England
[21] Appl. No. 775,066
[22] Filed Nov. 12, 1968
[45] Patented Feb. 2, 1971
[73] Assignee British Telecommunications Research Limited
  Taplow, England
  a British company

[54] CONTROL SYSTEMS
  9 Claims, 7 Drawing Figs.
[52] U.S. Cl. ................................................. 137/39, 137/81.5
[51] Int. Cl. ................................................. F16k 17/36
[50] Field of Search............................................ 137/81.5
  (Inquired), 38, 39; 73/415; 415/14, 17; 235/200 (Inquired)

[56] References Cited
UNITED STATES PATENTS
3,233,522 2/1966 Stern ............................. 137/81.5X
3,260,271 7/1966 Katz ............................. 137/81.5X
3,339,571 9/1967 Hatch ............................. 137/81.5
3,342,196 9/1967 Przybylko ....................... 137/81.5X
3,352,267 11/1967 Brandriff ........................ 137/81.5X
3,363,595 1/1968 Brandriff ........................ 137/81.5X
3,393,692 7/1968 Geary ............................ 137/81.5X
3,395,718 8/1968 Wolff ............................ 137/81.5X
3,395,719 8/1968 Boothe ........................... 137/81.5X
3,410,287 11/1968 Heyden .......................... 137/81.5X Primary Examiner—Clarence R. Gordon
Attorney—Young & Thompson ABSTRACT: A control system for exercising a control in dependence upon the function $\frac{N}{\sqrt{T}}$ where N is a rotational speed and T is a fluid temperature in which first and second pulses are produced whose timing is dependent on the rotational speed. The first pulse is transmitted through a delay line containing fluid at the temperature T and compared in a comparator with the second pulses. The output from the comparator is used as a feed back signal to bring the two pulses into coincidence.

INVENTORS
JOHN CHRISTOPHER HAMMOND DAVIS
GUY EDWARD DAVIES
BY Young + Thompson
ATTYS.

CONTROL SYSTEMS

This invention relates to systems and arrangements for exercising a control in dependence upon the function $$\frac{N}{\sqrt{T}}$$

where $N$ is a rotational speed and $T$ is a fluid temperature. A particular, although by no means exclusive application of the invention, is to the provision of a closed loop servo system for controlling the inlet guide vanes on a gas turbine engine. In such application the control parameter is $$\frac{N}{\sqrt{T_2}}$$

where $N$ is the rotational speed of the compressor and $T_2$ is the absolute total temperature of the compressor delivery air.

Broadly, the invention employs a fluidic system comprising means for comparing the timing of fluid pressure pulses whose initial timing is determined by the rotational speed $N$ and one of which is transmitted through a delay line of predetermined and known length and which is filled with fluid at the temperature $T$. From such comparison means is derived an output signal suitable for operating or controlling the operation of actuator means for causing alteration of a variable affecting either the rotational speed, the temperature or the geometry of the system so that the compared pulses are or can be brought into time coincidence.

The nature of the invention will be better understood from the following brief description of arrangements embodying the invention and adapted to control the inlet guide vanes of a gas turbine engine given in conjunction with the accompanying drawings.

Throughout the drawings, the reference V is used to denote a vent and the reference S is used to denote a steady power supply. The various power supplies S are not all at the same pressure.

Figure 1:
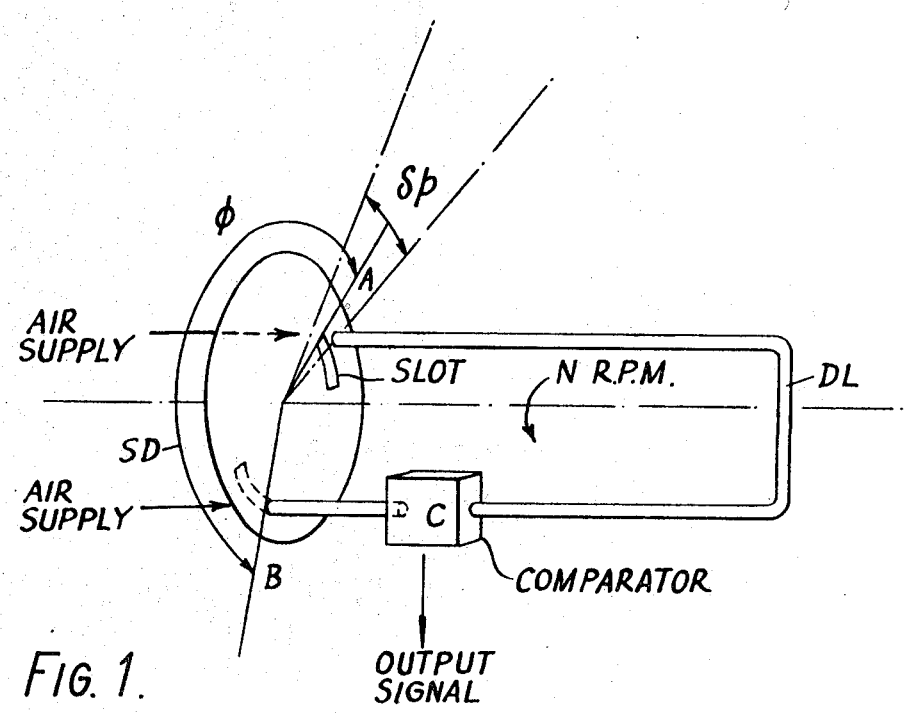
FIG. 1 is a schematic diagram of a system for exercising a control in dependence on the parameter $$\frac{N}{\sqrt{T}}$$

In FIG. 1, a rotating slotted disc SD driven by the compressor generates a signal pulse by momentarily allowing access of fluid pressure to the end A of a conduit forming a delay line DL filled with the fluid at temperature $T$. After a time delay $\delta t_A$ this pulse arrives at one input of a pulse timing comparator C. After a similar delay time $\delta t_B$ the disc has turned through an angle , and, in like manner, generates a reference pulse at B which is fed without further delay into the opposite input of the comparator C.

The signal pulse is transmitted with a velocity $$V_p = M_P \sqrt{\gamma R_g T}$$

where $M_P$ is a constant dependent on the pressure ratio across the leading edge of the pulse and $T$ is the absolute temperature of the fluid in the delay line. The terms $\gamma$ and $R_g$ are substantially constant for a given gas (in this case air) over the range of temperature normally encountered. The delay time $\delta t_A$ is then $$\delta t_A = \frac{1}{M_p \sqrt{\gamma R_g T}}$$

seconds where 1 is the length of the delay line in centimeters.

The delay time $\delta t_B$ is given by $$\delta t_B = \frac{\Phi}{6N}$$

seconds, where $\Phi$ is in degrees and $N$ is in r.p.m.

When $$\delta t_A = \delta t_B, \quad \Phi = \frac{61}{M_p \sqrt{\gamma R_g}} \cdot \frac{N}{\sqrt{T}}$$

the comparator C then gives no output. When $\delta t_A \neq \delta t_B$ one pulse arrives at C before the other and the comparator gives one of two possible outputs corresponding respectively to $\delta t_A < \delta t_B$ and $\delta t_A > \delta t_B$. The output from C causes the inlet guide vane (hereinafter referred to as I.G.V.) actuator to move the guide vanes in the appropriate direction and a mechanical feedback linkage changes the angle correspondingly, for example, by moving the inlet A or B around an arc centered on the axis of the disc SD. The output from the comparator ceases when has changed sufficiently to cause $\delta t_A$ to become equal to $\delta t_B$.

Figure 2:
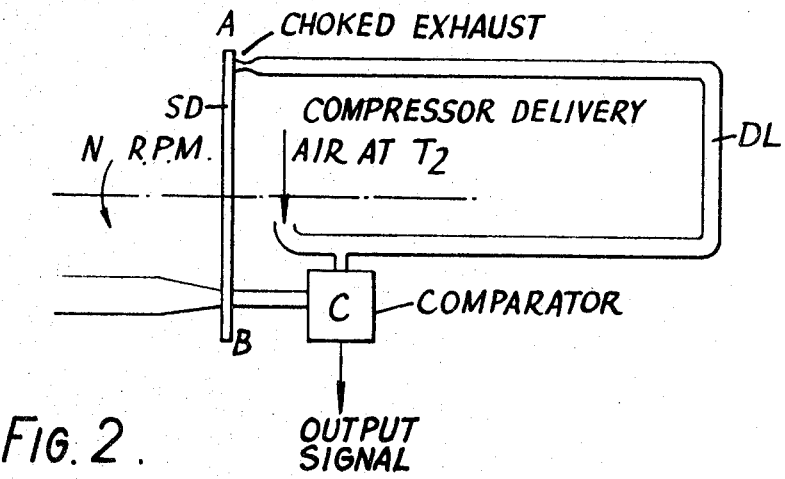
FIG. 2 is a schematic diagram illustrating a basic system in accordance with the invention.

FIG. 2 shows an arrangement for maintaining a constant pressure ratio across the pulse to maintain $M_p$ constant. The delay line DL is flushed with compressor delivery air at temperature $T_2$, exhausting at A through a choked nozzle. If the pressure ratio across the exhaust is insufficient to choke a normal nozzle, a venturi may be used instead. The signal pulse is now generated in the delay line by the movement of a lobe on the disc which momentarily blocks the exhaust, thereby transmitting a pressure pulse against the flushing air stream to the comparator at C. Since the exhaust is choked the Mach number of the flushing air stream is constant (determined by geometry only) so that pulse pressure ratio, and hence $M_p$, is also constant.

Figure 3:
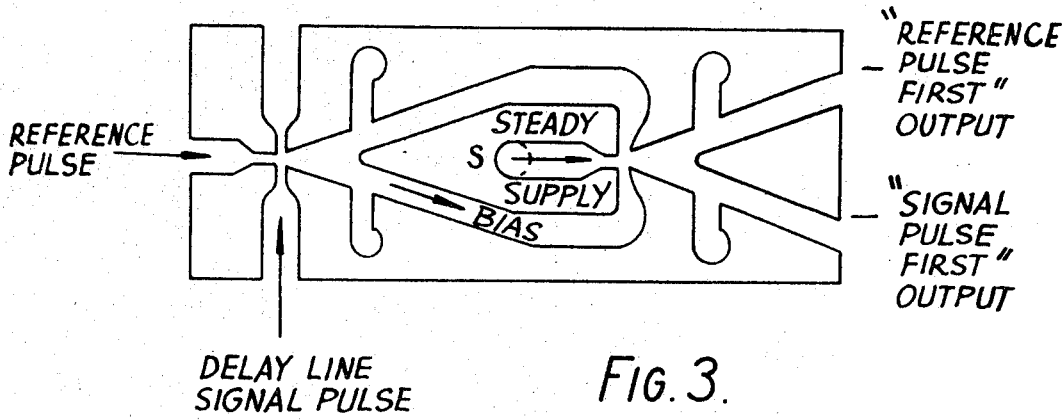
FIG. 3 is a schematic diagram illustrating a fluidic pulse timing comparator.

The function of the comparator C is to compare the arrival time of each signal pulse with that of the corresponding reference pulse. A preferred form of such comparator comprises fluidic devices as illustrated in FIG. 3.

The comparator C is required to have three output states corresponding to:

$$\delta t_A < \delta t_B, \quad \delta t_A = \delta t_B, \quad \delta t_A > \delta t_B$$

Figure 4:
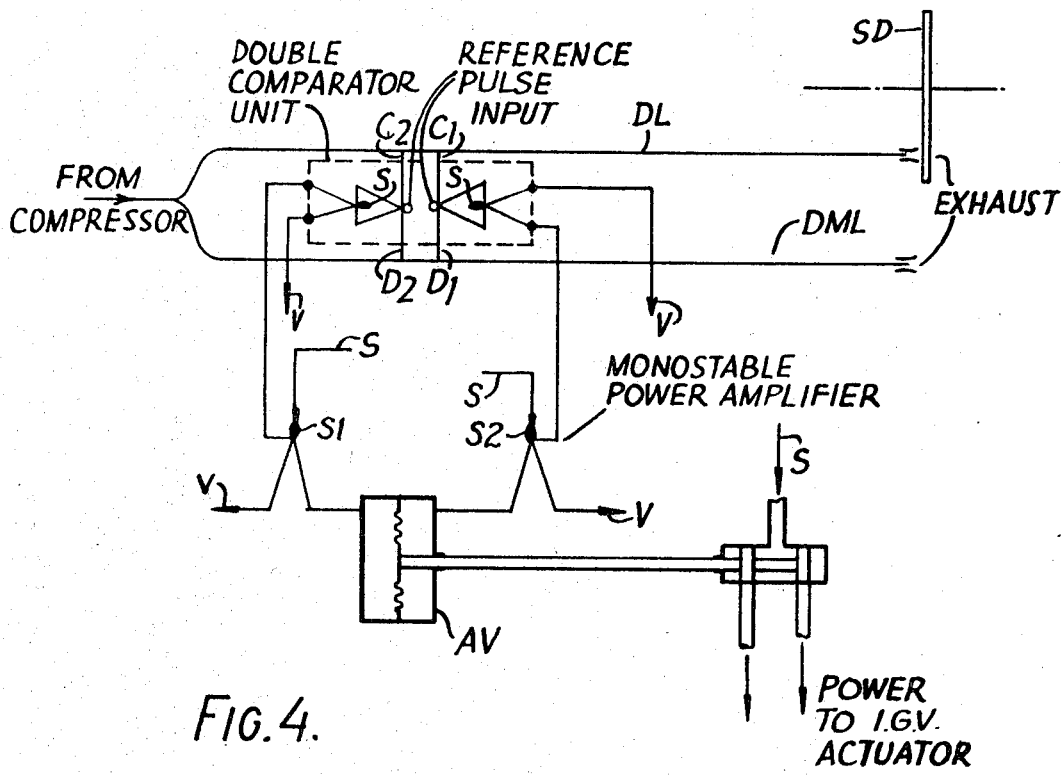
FIG. 4 is a schematic diagram illustrating a system in accordance with the invention using a comparator of the type illustrated in FIG. 3.

In order to achieve this, two switching units are required. These are arranged with their respective signal pulse inputs separated by a small distance on the delay line as shown in FIG. 4. The separation corresponds to a deadband region where $\delta t_A = \delta t_B$ and no output is obtained.

When $\delta t_A < \delta t_B$ or $\delta t_A > \delta t_B$, corresponding outputs are generated and fed via power amplifiers to the I.G.V. servo actuator valve AV. This will most conveniently take the form of a diaphragm valve arrangement as also shown in FIG. 4. The power amplifiers conveniently take the form of monostable fluidic switching devices S1 and S2 of the same general form.

In order to prevent noise in the compressor delivery air from causing spurious switching of the comparator fluidic devices a dummy delay line DML is preferably used with connections to inputs D1 and D2 of the double comparator unit, as also shown in FIG. 4, to balance the devices and provide a noise canceling arrangement.

Figure 5:
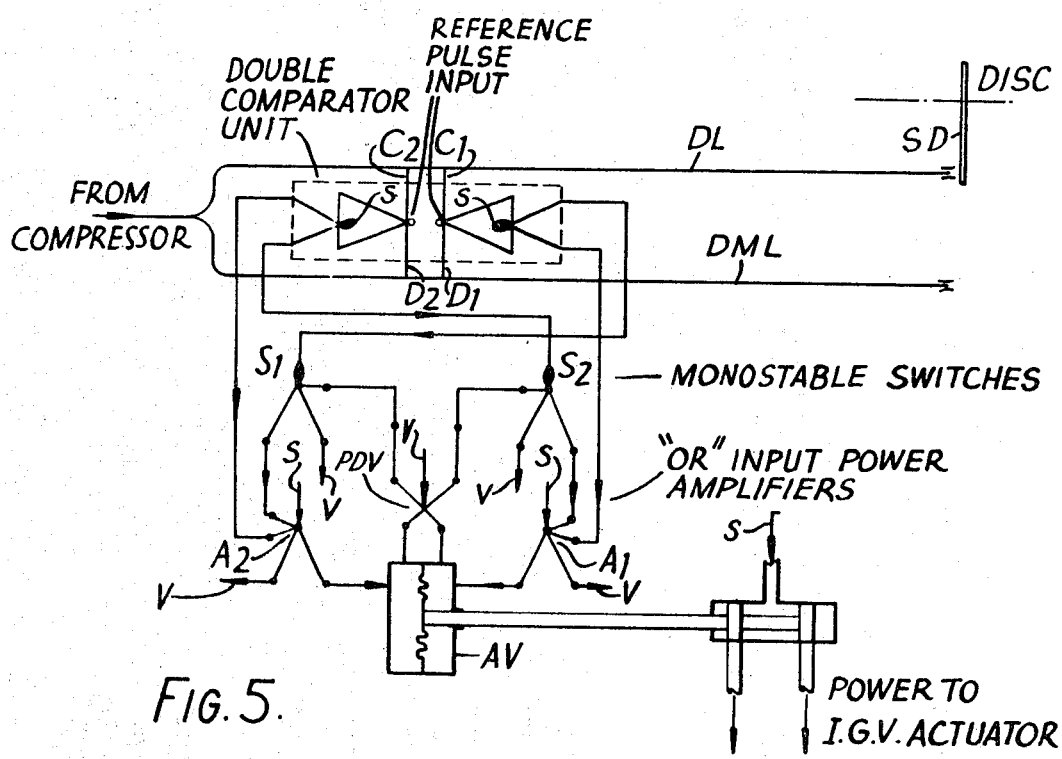
FIG. 5 is a schematic diagram of a system similar to that illustrated in FIG. 4 but including feedback.

In order to provide adequate stability in the system rate feedback may be required as shown in FIG. 5.

During normal operation over the working range the leading edge of the signal pulse in the delay line lies between $C_1$ and $C_2$ when the reference pulse is applied. In this condition the outputs from the double comparator unit are vented via the monostable switches $S_1$ and $S_2$. If the I.G.V. angle is incorrect for the existing value of $$\frac{N}{\sqrt{T_2}}$$

the leading edge of the signal pulse will not lie between $C_1$ and $C_2$ and an output from the double comparator unit then switches on one of the monostable power amplifiers $A_1$ or $A_2$. One side of the diaphragm valve AV is then pressurized thereby admitting power to the I.G.V. actuator. The rate of operation of the I.G.V. actuator is dependent on the displacement of the diaphragm valve, which in turn is dependent on the pressure difference across it. This signal, detected by a passive difference unit PDU is used to bias the appropriate switch $S_1$ or $S_2$. Thus if $A_1$ is switched on, $S_1$ receives a bias signal, although it has no supply pressure until $A_1$ is released.

When the actuator has established the correct I.G.V. angle the leading edge of the delay line signal pulse once again lies between $C_1$ and $C_2$, the appropriate amplifier $A_1$ or $A_2$ is again switched off, and power is restored to the corresponding switch $S_1$ or $S_2$. However, due to the delay in exhausting the diaphragm valve via the amplifier vents, a pressure difference remains for a short time causing continued movement of the I.G.V. actuator. Compensation for this is applied through the appropriate switch $S_1$ or $S_2$ when it regains its power supply from the double comparator unit.

Since the switch concerned is still biased by the pressure difference in the diaphragm valve AV its output is not vented and so switches on the opposing power amplifier. This remains on until the pressure difference in the diaphragm valve is reduced to zero when the switch is released and the amplifier switched off. The pressures on the opposite sides of the diaphragm valve then decay at the same rate.

Figure 6:
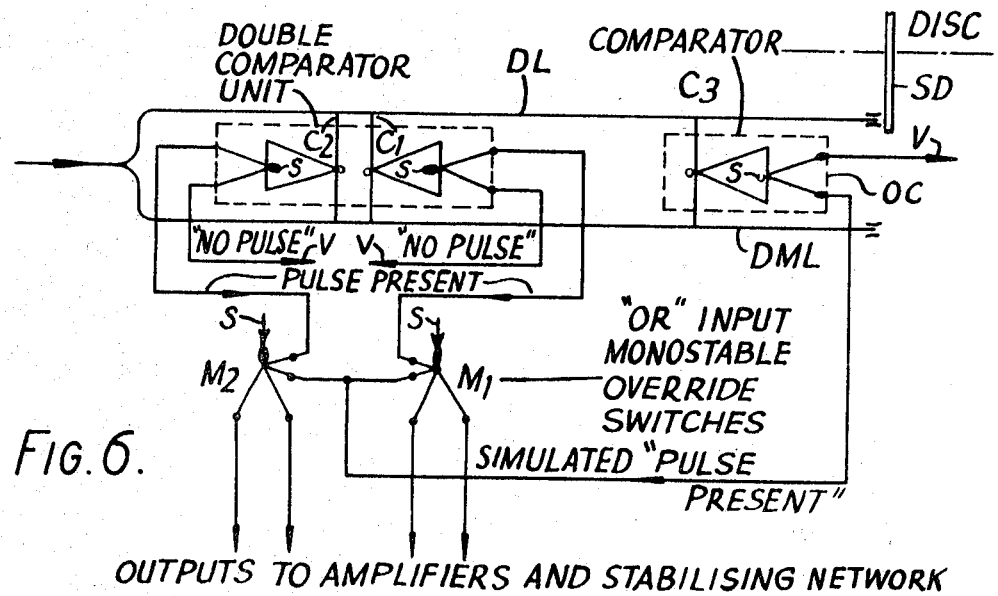
FIG. 6 illustrates an alternative system having provision for preventing maloperation when the first pulse is received by the comparator a long time before the second pulse.

At very low values of $$\frac{N}{\sqrt{T_2}}$$

such as occur at low engine power, the signal pulse will pass completely through the delay line DL before the reference pulse is applied. The double comparator unit, however, will produce an output corresponding to that for high $$\frac{N}{\sqrt{T_2}}$$

i.e. as if the signal pulse had not yet arrived. In order to deal with this condition an override comparator as shown at OC in FIG. 6 may be provided.

In normal operation, i.e. when the leading edge of the signal pulse lies between $C_1$ and $C_2$ on the delay line DL, the pulse occupies a sufficient length of the line to overlap the override comparator position $C_3$. The override comparator always sees a pulse when the reference pulse is applied and its output is vented. The double comparator unit drives the or input monostable override switches $M_1$ and $M_2$ to provide a normal output to the amplifiers and stabilizing network.

At very low values of $$\frac{N}{\sqrt{T_2}}$$

when the signal pulse passes completely through the delay line the override comparator OC will see no pulse when the reference pulse is applied. Its output is then switched to provide a simulated "pulse present" signal to the OR input switches $M_1$ and $M_2$. This signal overrides any input from the double comparator unit and delivers to the amplifiers and stabilizing network a signal consistent with the low value $$\frac{N}{\sqrt{T_2}}$$

Figure 7:
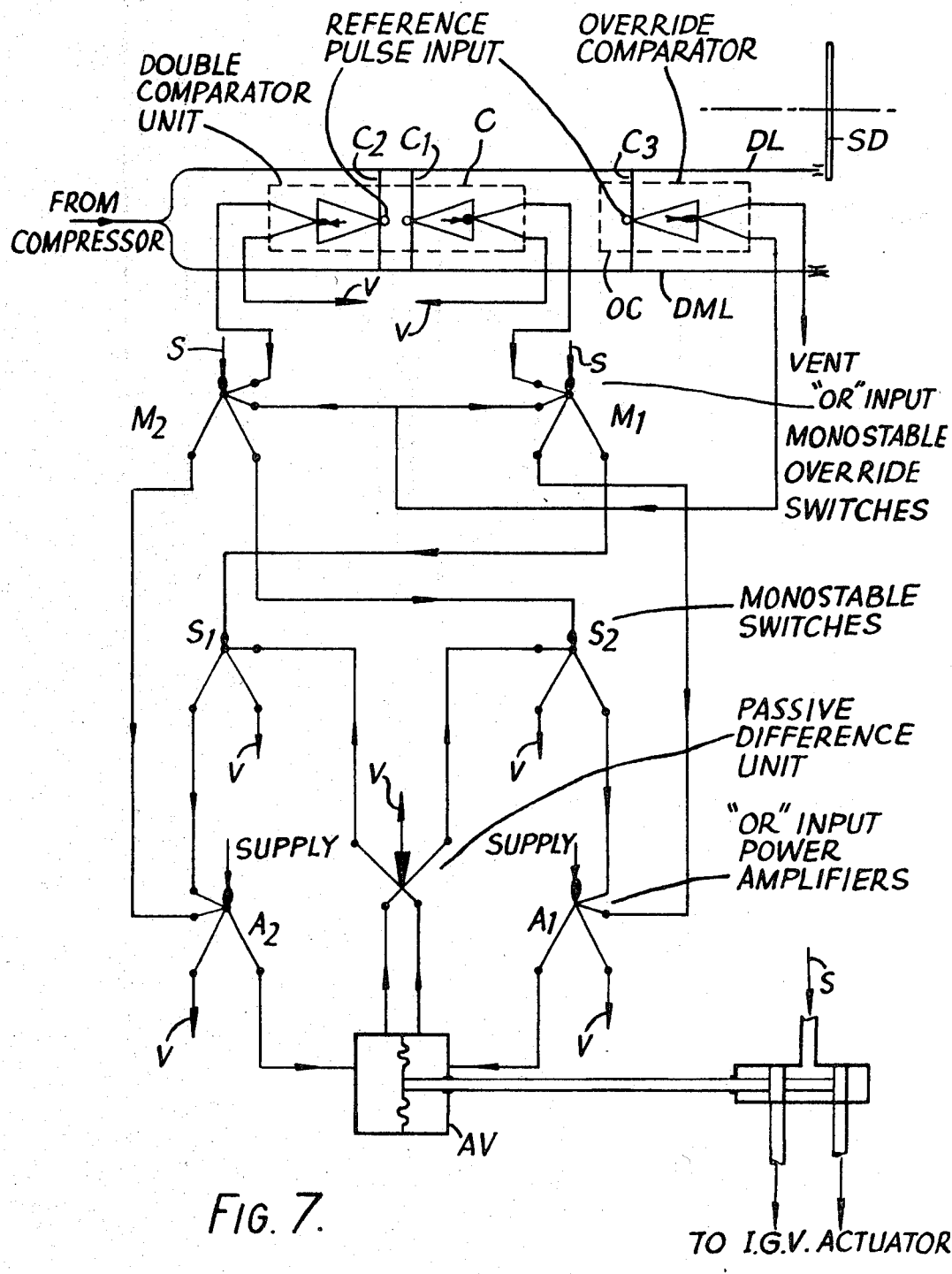
FIG. 7 is a schematic diagram illustrating a system in accordance with the invention incorporating all features illustrated in FIGS. 4 to 6.

FIG. 7 is a schematic diagram of the complete system.

Conventional systems for controlling the inlet guide vanes of a gas turbine engine use the parameter $$\frac{N}{\sqrt{T_1}}$$

$T_1$ where $T_1$ is the engine intake total temperature. Control with respect to $$\frac{N}{\sqrt{T_2}}$$

$T_2$ is, as provided by the present invention, preferred for thermodynamic reasons.

The system described above can be modified however, to control with respect to $$\frac{N}{\sqrt{T_1}}$$

by flushing the delay line DL and dummy line DML with engine intake air instead of compressor delivery air. The delay line and dummy must still exhaust to a low enough pressure to choke the exhaust nozzles; a suction pump (e.g. jetejector pump) may be needed in order to provide the requisite low pressure.

The logic arrangements described above may be modified by using inverse signals throughout but both sides of the diaphragm amplifier will then be pressurized when the system is at rest.

The mechanical feedback may vary the delay line length instead of changing the angle $\Phi$. In this case when $\delta t_A = \delta t_B$, $$\frac{1}{l} = \frac{6}{\phi M_D \sqrt{\varphi R_g}} \frac{N}{\sqrt{T}} \text{ so that } \frac{1}{l} \alpha \frac{N}{\sqrt{T}}.$$

The system according to the invention may be used to control other components or quantities with respect to $$\frac{N}{\sqrt{T_2}} \left( \text{or } \frac{N}{\sqrt{T_1}} \right)$$

provided a mechanical feedback is available, while another very simple application resides in the use of one or more comparators to provide simple switching functions at one or more specific values of $$\frac{N}{\sqrt{T_2}} \left( \text{or } \frac{N}{\sqrt{T_1}} \right)$$

with no mechanical feedback.

We claim:

1. Apparatus for exercising a control in dependence on a function comprising the product of frequency and the reciprocal of the square root of a temperature, said apparatus comprising means for supplying a stream of fluid at said temperature; means for generating a first fluid pulse in said stream of fluid at a time determined by said frequency; a comparator having first, second and third output states; a fluid delay line for continuously transmitting said stream of fluid to said comparator, means for supplying to said comparator; a second fluid pulse whose timing is determined by said frequency; and actuator means responsive to said comparator for increasing a variable affecting at least one of the group comprising said temperature, the geometry of the apparatus and said frequency when said comparator is in its first output state, decreasing said variable when said comparator is in its second output state and leaving said variable unaltered when said comparator is in its third output state, whereby the compared pulses can be brought into time coincidence.

2. Apparatus as claimed in claim 1, in which the means for generating the first and second fluid pulses comprises a disc arranged to rotate at a speed proportional to said frequency, to allow passage of fluid when in predetermined orientations and to inhibit passage of fluid in other orientations.

3. Apparatus as claimed in claim 2, in which the actuator means is arranged to vary the relative angular disposition round the axis of rotation of the disc of the means for generating the first fluid pulse and the means for generating the second fluid pulse.

4. Apparatus as claimed in claim 2, in which the means for generating the second pulse includes a nozzle arranged to direct fluid onto the disc, a collector aligned with the nozzle on the other side of the disc and a slot in the disc at the same radial distance as the nozzle and collector from the axis of rotation of the disc.

5. Apparatus as claimed in claim 2 in which the means for generating the first pulse includes an exhaust at the end of the delay line confronting the disc and a protuberance on the disc at the same radial distance from the axis of rotation of the disc as the exhaust and the arrangement being such that the exhaust is choked except when the protuberance is in alignment therewith.

6. Apparatus as claimed in claim 5, in which the comparator comprises a pair of biased bistable fluidic devices a first one of which is arranged to produce an output signal if the leading edge of the second pulse is received more than a predetermined time after the leading edge of the first pulse but before the end of the first pulse and the other of which is arranged to produce an output signal if the leading edge of the second pulse is received more than a predetermined time before that of the first pulse.

7. Apparatus as claimed in claim 6, in which each of said output signals from the first and second bistable devices is operative to actuate the supply of fluid to a respective side of a diaphragm valve and a switching arrangement is provided for equalizing the pressure across the diaphragm when such output ceases.

8. Apparatus as claimed in claim 6, in which the comparator includes a third bistable device having an input connected to the delay line nearer to the exhaust then the first and second bistable devices and arranged to produce an output if the trailing edge of the first pulse has passed before the leading edge of the second pulse is received, said output signal being arranged to produce the same effect as said output signal from said first bistable device.

9. Apparatus as claimed in claim 6, including an auxiliary delay line arranged to be supplied with fluid from the same source as that supplied to the first mentioned delay line and having inputs to the bistable device so connected thereto that identical signals from the two delay lines oppose one another in the comparator.